United States Patent
Homer et al.

(10) Patent No.: US 6,487,081 B2
(45) Date of Patent: Nov. 26, 2002

(54) HARD DISK DRIVE MOUNTING SYSTEM AND METHOD

(75) Inventors: Steve S. Homer, Tomball, TX (US); Ronald E. DeLuga, Spring, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 55 days.

(21) Appl. No.: 09/752,130

(22) Filed: Dec. 29, 2000

(65) Prior Publication Data

US 2002/0085358 A1 Jul. 4, 2002

(51) Int. Cl.[7] ............................................. H05K 5/00
(52) U.S. Cl. ...................... 361/730; 361/685; 361/752; 312/223.2
(58) Field of Search ................................ 361/724–730, 361/752, 753, 759, 683–685; 312/223.1–223.3; 248/201

(56) References Cited

U.S. PATENT DOCUMENTS

| | | | |
|---|---|---|---|
| 5,305,180 A | * 4/1994 | Mitchell et al. | 361/685 |
| 5,340,340 A | 8/1994 | Hastings et al. | 439/64 |
| 5,392,175 A | 2/1995 | Beecroft | 360/97.01 |
| 5,488,538 A | 1/1996 | Wakita | 361/685 |
| 5,564,804 A | 10/1996 | Gonzalez et al. | 312/223.2 |
| 5,572,402 A | 11/1996 | Jeong | 361/685 |
| 5,586,003 A | * 12/1996 | Schmitt et al. | 312/332.1 |
| 5,682,291 A | * 10/1997 | Jeffries et al. | 361/683 |
| 5,828,548 A | 10/1998 | Chen | 361/685 |
| 5,930,218 A | 7/1999 | Mitsui et al. | 369/77.1 |
| 5,995,364 A | 11/1999 | McAnally et al. | 361/685 |
| 6,061,232 A | 5/2000 | Ho | 361/685 |
| 6,081,422 A | 6/2000 | Ganthier et al. | 361/686 |
| 6,084,768 A | 7/2000 | Bolognia | 361/685 |
| 6,122,138 A | 9/2000 | Khanna et al. | 360/97.01 |
| 6,122,164 A | 9/2000 | Liao et al. | 361/685 |
| 6,130,817 A | * 10/2000 | Flotho et al. | 361/685 |
| 6,249,432 B1 | * 6/2001 | Gamble et al. | 248/618 |
| 6,262,883 B1 | * 7/2001 | Kim | 361/679 |
| 6,272,011 B1 | * 8/2001 | Chen | 248/611 |
| 6,282,087 B1 | * 8/2001 | Gibbons et al. | 361/685 |
| 6,304,440 B1 | * 10/2001 | Lin | 248/581 |
| 6,318,679 B1 | * 11/2001 | Yang et al. | 248/201 |

* cited by examiner

Primary Examiner—David L. Talbott
Assistant Examiner—Tuan Dinh
(74) Attorney, Agent, or Firm—Conley, Rose & Tayon, P.C.

(57) ABSTRACT

A generic mounting structure is provided between a hard disk drive (HDD) and a computer. The structure includes a plurality of nubs disposed on a brace that can be fitted onto a HDD. The nubs are preferably cylindrical members having an enlarged diameter head. The computer includes, either internally or externally, a bay having a boot interface that closely receives the nubs. The boot interface includes a tapered slotted recess that closely receives the enlarged diameter head of the nubs. In a preferred embodiment, at least two different computer platforms incorporate a substantially identical bay design. Likewise, a brace having nubs oriented in a manner complementary to the bay design is fitted onto at least two different HDDs. Because the HDDs and computer platforms have common mechanical connection by virtue of the brace and bay designs, the HDDs may be exchanged between these computer platforms. In a different embodiment of the present invention, the nubs may be formed directly onto the HDD itself.

14 Claims, 4 Drawing Sheets

HARD DISK DRIVE MOUNTING SYSTEM AND METHOD

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to mounting systems and arrangements for storage devices, such as hard disk drives, for computers. More particularly, the present invention relates to a standardized mounting arrangement that can accept hard disk drives of varying sizes. Still more particularly, the present invention relates to mounting arrangements wherein a hard disk drive carriage presents at least one connecting member that engages a slotted interface provided in a bay of a computer. In a different aspect, the present invention relates to methods for installing a hard disk drive into a computer using solid mounting.

2. Description of the Related Art

Computers typically include at least one non-volatile storage device. Examples include hard disk drives (HDD), CD ROMs, and the like. Data and/or programs can be stored on such devices and remains there even if the computer is powered off. For the sake of simplicity, the following disclosure refers to HDDs, but relates generally to any type of storage device.

As is also well known, the memory capacity of an HDD is often dictated by the physical size of the HDD. That is, as magnetic elements used to store the data are increased in physical size or number, the capacity to store data is correspondingly increased. Typically, the cost, the physical dimensions, and the weight of a HDD increase as the memory capacity increases. Thus, for reasons such as computer cost or handling convenience, a computer user may opt for a computer having a certain memory capacity—rather than the maximum available. Accordingly, a computer manufacturer may offer a range of computer models, each having a unique combination of memory capacity and other hardware features (e.g., processor speed, video cards, sound cards, etc.). The types of computers a manufacturer offers can range from network servers and "desktops" to portable computers. As is also known, size and weight considerations are particularly relevant for portable computers.

In the past, offering a range of computer configurations required a manufacturer to design a mounting structure for the HDD that accommodates the specific needs of each different computer model or platform, i.e., a platform-specific mounting arrangement. Thus, even though a particular capacity HDD may be available for a number of computer platforms, the mounting arrangement for that HDD may vary depending on the computer platform. Prior art computer platform-specific HDD mounting arrangements have a number of drawbacks.

First of all, a platform-specific mounting arrangement complicates the design of each new computer model. For example, a platform-specific mounting arrangement require its own inventory of parts to support fabrication, repair and maintenance activities. Also, where prior art mounting systems may be used to accommodate different sizes of HDDs, there are problems with the mounting arrangements' ability to protect an HDD during a shock event. For example, a computer and especially portable computers that are subject to frequent handling may be dropped or otherwise jarred sharply. In larger computers, such a shock event may be protected against by providing an isolation mechanism at the connection between the HDD and the computer. In smaller computers, there is no such space available to provide a shock isolation feature. Accordingly, with small computers, a generally solid connection is provided in order to prevent the HDD from moving relative to the computer. That is, the HDD is prevented from rattling or becoming dislodged within the housing of the computer. With prior art mounting arrangements, attempting to vary the size of an HDD within a computer either reduces the amount of space available for a shock isolation feature or unacceptably compromises the integrity of the solid mounting connection between the HDD and the computer.

Furthermore, a platform-specific mounting arrangement also creates difficulties for the computer user. For example, computer users may, on occasion, wish to access files by simply exchanging HDDs. With prior art platform-specific mounting arrangements, only users that had the same computer platform could share HDDs. Also, where individuals in an organization used different computer platforms, that organization's resource manager (e.g., Information Technology Manager) may be required to stock a variety of HDDs, thereby increasing the cost and complexity of maintaining its computers.

The present invention overcomes these and other disadvantages of the prior art.

BRIEF SUMMARY OF THE INVENTION

The present invention overcomes the disadvantages of the prior art by providing a mounting arrangement that accepts multiple configurations of HDDs while maintaining an acceptable level of solid mounting between the HDD and a computer. A preferred mounting arrangement made in accordance with the present invention includes a carrier and a bay. Preferably, the carrier includes a brace that engages the HDD. The brace includes nubs, a base plate, a connector and alignment pins. In an alternate embodiment, the features of the brace are incorporated directly onto the HDD housing. The bay, which may be within a computer housing or external docking station, is adapted to receive the carrier and HDD assembly. The bay is defined by sidewall having boot interfaces that receive the brace nubs and a connector interface that engage the brace connector and alignment pins.

When the HDD and carrier assembly is docked into the bay, the brace nub snugly seats within the boot interface to establish a substantially rigid connection between the carrier and HDD assembly and the computer. At the same time, the alignment pin enters the alignment pin receptacle and to align the connector to the connector interface. Once the HDD is secure in the bay, a bezel, lid or cover may engage and secure the carrier within the bay.

In a preferred implementation of the present invention, a common bay configuration is used for two or more computer platforms. Thus, once a brace corresponding to the bay configuration is fitted onto a given HDD, that HDD may be installed into those two or more computer platforms.

BRIEF DESCRIPTION OF THE DRAWINGS

For a detailed description of the preferred embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

Although the preferred embodiment is described in relation to an HDD, the mounting system described herein can apply to other types of storage devices. Additionally, terms such as "front," "rear," "upper" and "lower" are used merely as a convenience to orient the described aspects of the present invention. Accordingly, the invention is not limited to any of the described exemplary orientations.

Further, the drawings are merely intended to illustrate the general arrangement of the present invention in a manner that will be understood by one of ordinary skill in the art. The drawings and illustrations are not intended to be to scale.

DETAILED DESCRIPTION OF THE PREFERRED EMBODIMENTS

Figure 1:
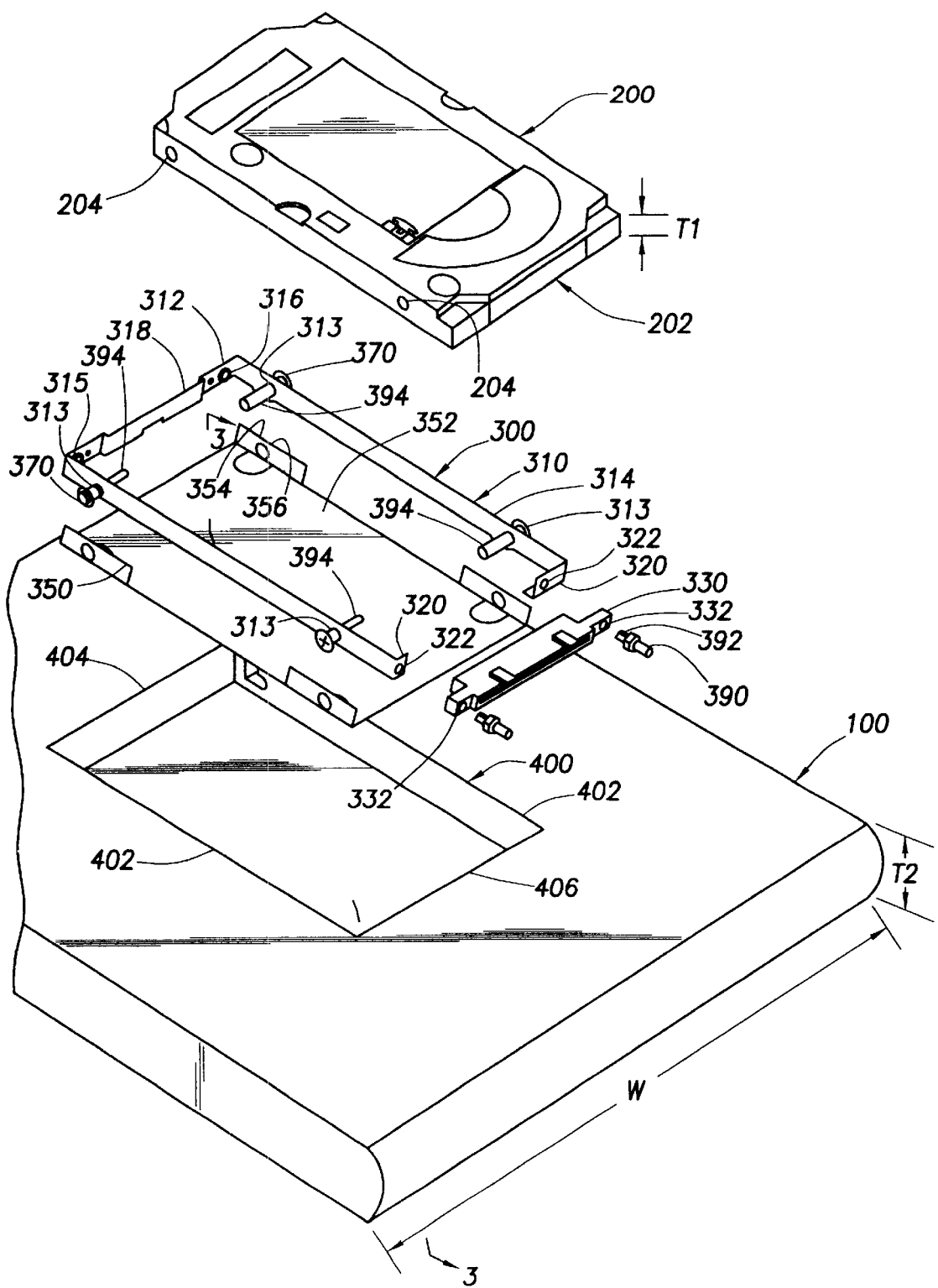
FIG. 1 is an exploded isometric view of an exemplary hard disk drive and a mounting arrangement made in accordance with a preferred embodiment of the present invention.

Referring initially to FIG. 1, there is shown an exemplary computer chassis 100, an exemplary hard disk drive (HDD) 200, a carrier 300, and a bay 400. While the mounting system described herein may be applied to any type of computer, the present discussion will be directed to portable computers models or platforms for simplicity. The term "model" or "platform" is used to indicate a computer configuration that has certain common technical or physical features. For example, a computer "model" may share a substantially identical computer housing or chassis. Furthermore, although HDD 200 is shown as generally rectangular, it will be appreciated that the present invention may be applied to a wide range of HDD shapes and sizes. As is known, HDDs are typically designed to applicable industry standards. Accordingly, the discussion below presumes that HDD will incorporate common features for enabling electrical and mechanical connections, such as a pin-type connector 202 and threaded holes 204 adapted to receive fasteners.

Referring still to FIG. 1, carrier 300 provides a generic mounting interface between HDD 200 and bay 400 of computer chassis 100 via one or more common mechanical connections. Preferably carrier 300 includes a brace 310, a connector 330, a base plate 350, a plurality of nubs 370, alignment pins 390, and fasteners 394.

Brace 310 is a generally U-shaped member formed in a shape generally complementary to the width of HDD 200. HDDs are generally offered in a few standard lengths and widths. Where brace 310 may be used on HDDs having differing external dimensions, the shape of brace 310 should account for variances in these external dimensions (e.g., by providing gaps or additional spacing). Nevertheless, multiple sized braces 310 may be needed only if the length and width dimensions of HDD 200 change. It is preferred that one brace 310 be used for HDDs 200 of different thicknesses. For example, HDD 200 as shown in FIG. 1 has a thickness T1 that may be the same or different from the thickness T1 of a second HDD 200 having the same or a different thickness T1. Alternatively, a separate sized brace 310 may be provided for each particular HDD width.

Brace 310 includes a back portion 312, mounting holes 313, and parallel arms 314. Back portion 312 may optionally include holes 316 and a creased portion 318 that cooperate with mounting devices, such as a door or bezel (not shown), to secure HDD 200 within bay 400. Mounting holes 313 are generally complementary to fasteners 394 in a manner described below. Parallel arms 314 each present an outer face 315 and inwardly-turned ends 320 having holes 322.

Connector 330 provides a robust interface between a typical pin-type connector 202 of HDD 200 and computer 100. While pin-type HDD connectors 202 may be directly plugged into computer 100, such connectors tend to fail after only a few installation/removal events. Connector 330 uses a more durable electrical connection that can withstand a number of installation and removal cycles. Designs of such connectors are known in the art and will not be discussed in detail. Connector 330 includes passages 332 adapted to receive alignment pins 390. It should be understood that other connector designs, including optical connections, may also be used.

Alignments pins 390 facilitates the process of installing HDD 200 into bay 400. Preferably, alignment pins 390 have a partially threaded shank 392 that mates with brace holes 322. Alignment pins 390 extend through connector passages 332 to clamp connector 330 against brace 310. Even though alignment pins 390 have been shown as separate parts, alignment pins 390 may be integral with either the connector 330 or the brace 310. Although it is preferable that alignment pins 390 act as a fastener that secures connector 330 to brace 310, separate fasteners may be used to accomplish this task.

Base plate 350 provides a barrier between HDD 200 and computer 100. Preferably, base plate 350 includes a flat portion 352 that presents a plurality of vertical tabs 354 each having holes 356. Depending on the hardware used, base plate 350 may act as an electrical, mechanical and/or magnetic insulator between HDD 200 and computer chassis 100. The design considerations of base plates are known in the art (e.g., the weight of base plate 350 may be reduced by providing perforations). Accordingly, these considerations will not be discussed further.

Figure 2:
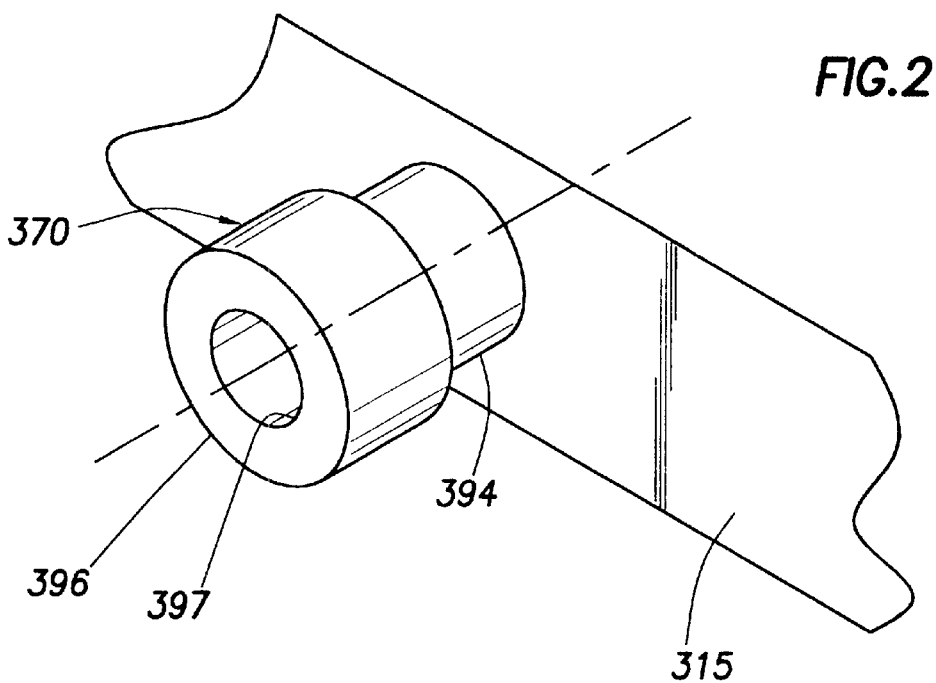
FIG. 2 is a isometric view of an exemplary nub made in accordance with a preferred embodiment of the present invention.

Still referring to FIG. 1, nubs 370 enable a generally rigid mechanical connection between HDD 200 and computer chassis 100. Preferably, a nub 370 is disposed on outer faces 315 of each parallel arm 314 proximate to back portion 312. Referring now to FIG. 2, nub 370 has a cylindrical portion 394 and an enlarged diameter head 396. Preferably, nub 370 is formed of a material, such as stainless steel, that will not shrink or otherwise lose its rigidity during the service life of computer chassis 100 (FIG. 1). Nub 370 also includes a passage 397 that closely receives fastener 394 (FIG. 1). Features such as close tolerances and rigid material properties are preferable so that nub 370 may efficiently transfer shock and other disruptive energies from computer 100 to HDD 200 without allowing HDD 200 to move relative to computer chassis 100.

Nubs 370 may be implemented in any number of alternate methods. For example, nubs 370 may be integral with fasteners 394. Such dual purpose nubs 370 may minimize the amount of parts for the carrier 300. Alternately, nubs 370 may be formed integrally with brace 310 or affixed to brace 310 in a manner other than through threaded fastening. The locations of nubs 370 may also be amenable to different arrangements. For example, nubs 370 may be positioned adjacent to arm front ends 320 or disposed on back portion 312. The specific locations or number of nubs 370 will likely be dictated by the expected range of configurations for computer chassis 100 and HDD 200. Further, while a generally cylindrical shape has been depicted for nubs 370, other shapes (e.g., oval, square, hexagonal) may also be used. In any case, a consideration is that the nubs 370 should provide a substantially rigid connection that allow HDD 200 to survive a shock event.

Figure 3A:
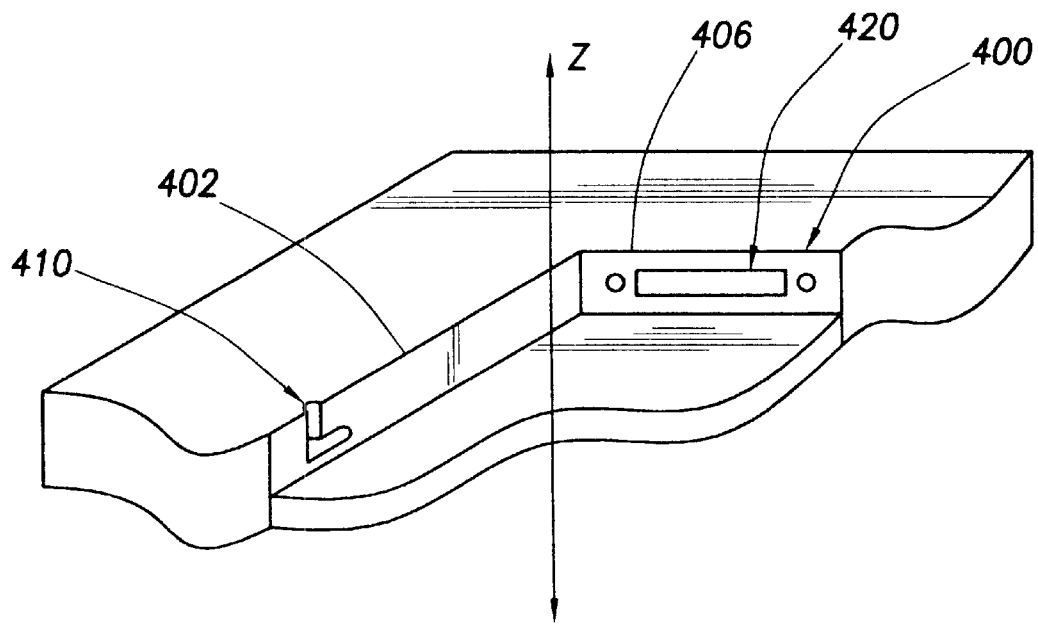
FIG. 3A is a cutaway view of a computer showing an exemplary bay made in accordance with a preferred embodiment of the present invention.
Figure 3B:
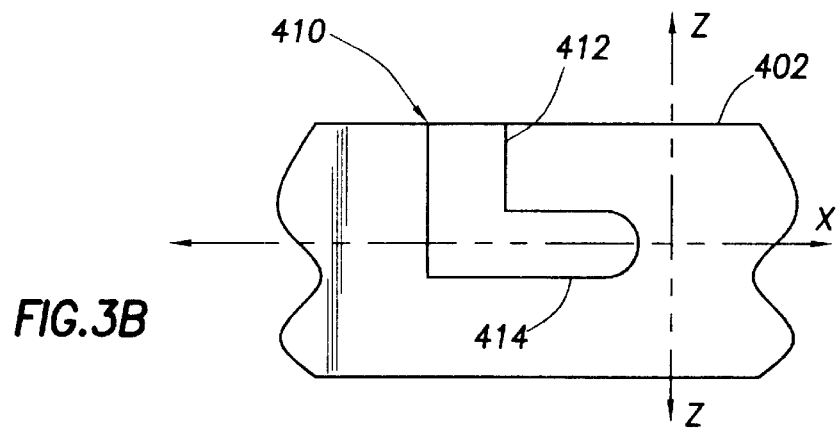
FIG. 3B is a cutaway view showing an exemplary boot interface made in accordance with a preferred embodiment of the present invention.

Referring now to FIGS. 1 and 3, bay 400 provides a space wherein the HDD 200 and carrier 300 assembly can dock into computer chassis 100. The depth of bay 400 is preferably sufficient to accommodate the varying thicknesses of different models of HDD 200. Bay 400 is generally defined by side walls 402, rear wall 404 and a front wall 406. Referring now to FIG. 3B, a boot interface 410 is preferably formed as an L-shaped recess into sidewalls 402. Boot interface 410 includes a vertical slot 412 and a horizontal slot 414. Slot 412 and 414 are generally sized to receive the enlarged diameter head 396 of nub 370 (FIG. 1). While vertical slot 412 may be sized generally to allow free movement of nub 370, the horizontal slot 414 should be sized to closely receive nub 370. Further, because horizontal slot 414 and nub 370 establish the mechanical connection between HDD 200 and computer 100, this connection should be as rigid as possible. Specifically, this generally rigid connection preferably minimizes or eliminates movement of HDD along the axis normal to horizontal slot 414, i.e., the "Z" axis shown. Accordingly, nub 370 and horizontal slot 414 should have as little clearance or "play" as feasible. Preferably, horizontal slot 414 is tapered along the "X" axis such that nub 370 encounters an increased clamping force as nub 370 travels along the "X" axis from vertical slot 412 toward front wall 406 (FIG. 3).

Figure 3C:
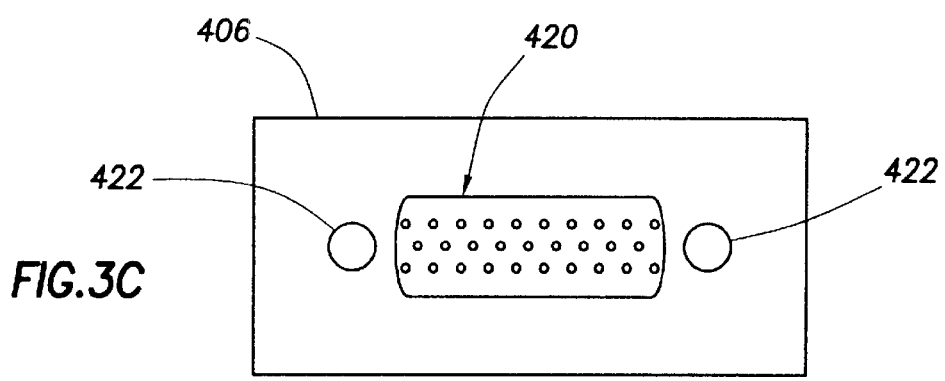
FIG. 3C is a cutaway view showing an exemplary connector interface made in accordance with a preferred embodiment of the present invention.

Referring now to FIG. 3C, front wall 406 includes connector support 420 that accepts connector 530 and alignment pins 390. Connector support 420 includes receptacles 422 to receive alignment pins 390 and a plug interface 424 complementary to connector 330.

Figure 4:
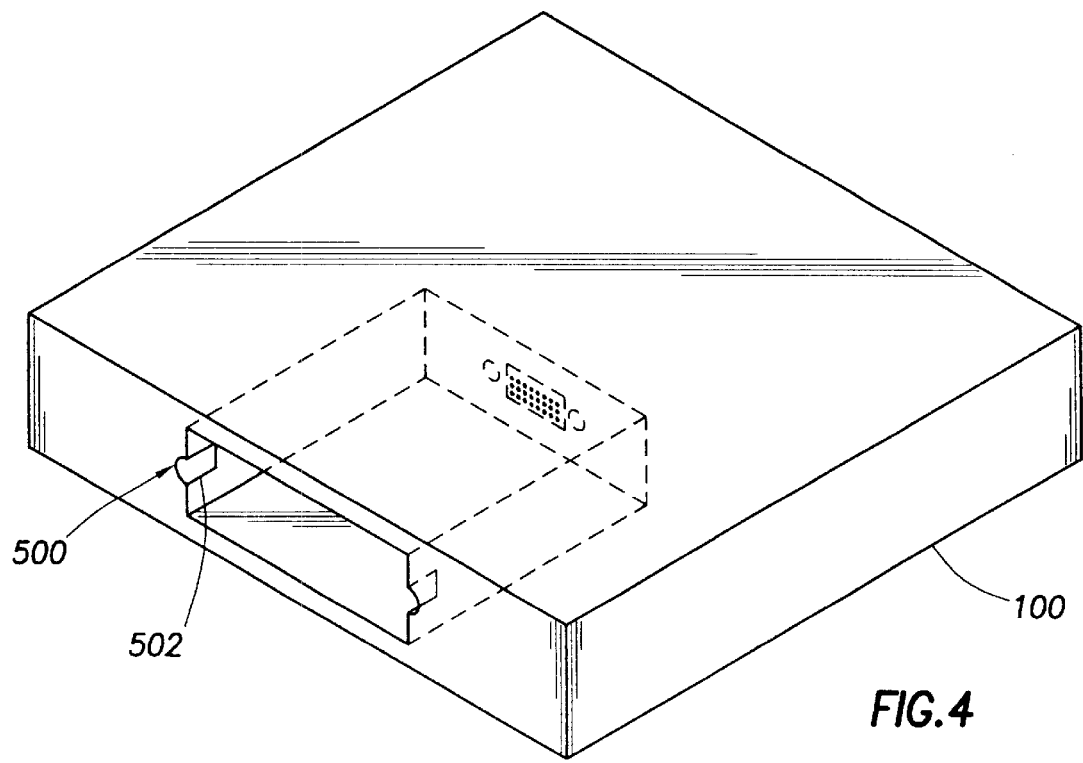
FIG. 4 is an isometric view showing an embodiment of a bay adapted for an "end mounted" HDD.

It should be understood that bay 400 may be easily modified to accept a side or front loading arrangement. Referring now to FIG. 4, there is shown an alternate boot interface 500 suited for "end loading" HDDs. Because HDD (not shown) is installed by sliding HDD 200 in a generally planar direction, boot interface 500 is provided with substantially horizontal slot 502 that preferably incorporates taper that provides increased clamping pressure as HDD 200 is slid into computer 100. In a different embodiment of the present invention, the mechanical connections (e.g., nubs) of brace 310 (FIG. 1) are formed integrally with HDD 200.

Referring now to FIGS. 1 and 3, it will be appreciated that nubs 370, alignment pins 390, boot interface 410 and connector interface 420 define a common connection arrangement that can be utilized for a variety of HDDs and computer platforms. With reference to FIG. 1, manufacturers often offer computer models that have some dissimilar feature, such as thickness T2, width W or weight. An exemplary implementation of an embodiment of the present invention may include providing at least two of these different computer models with a common bay configuration, i.e., substantially identical boot interfaces and connector interfaces. In another embodiment, a brace complementary to a common bay configuration can be provided on at least two HDD models that have different thicknesses. Thus, HDDs fitted with such a brace may then be used interchangeably with any computer platform having the common bay configuration.

It should be noted that there need not be a one-to-one correspondence between boot interfaces 410 and nubs 370. For example, all computer bays may be provided with four boot interfaces. The carriers, however, may be provided with two or four nubs, depending on the shock requirements and rigidity needs of a particular HDD. Moreover, even though two axially symmetric alignment pins have been shown, fewer or greater alignment pins may also be used. Moreover, these alignment pins need not be symmetric in order to align the HDD to the computer.

Although bay 400 is shown as a cavity formed into computer 100, this is merely one preferable embodiment for bay 400. For example, in addition to being internal to computer 100, bay 400 may be utilized with a docking station or other external housing device (not shown). Furthermore, it should be understood that elements such as base plate 350, alignment pins 390, and connector 330 are merely a preferable aspects of an embodiment described.

Figure 5:
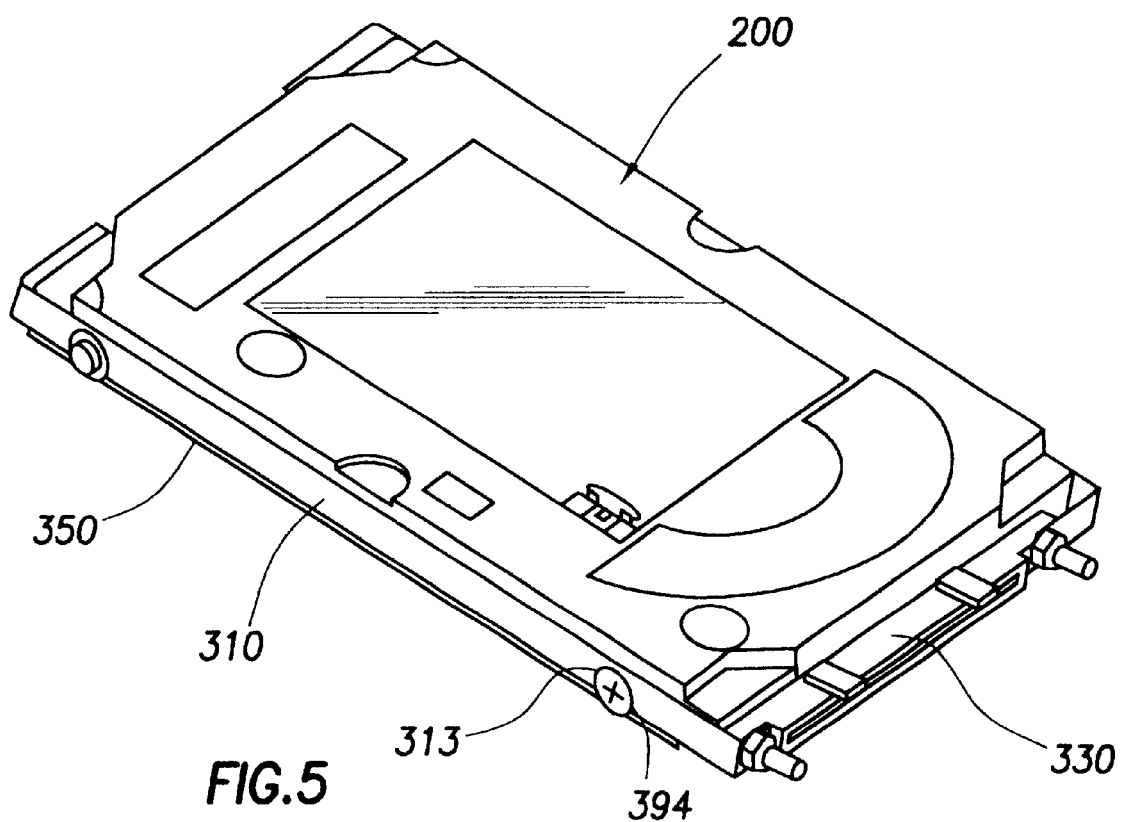
FIG. 5 illustrates an exemplary brace fitted onto an HDD.

Referring now to FIGS. 1 and 5, prior to installation of HDD 200 into computer 100, HDD 200 is seated onto base plate 350 and brace 310 is fitted around HDD 200. Fasteners 394, are inserted through brace holes 313 and base plate holes 356 to engage complementary threaded holes 202 in HDD 200. Thus, fasteners 394 secure nubs 370 (where used), brace 310 and base plate 350 to HDD 200. After connector 330 is plugged onto HDD 200, the threaded shank 392 of alignment pins 390 are inserted through connector passages 322 and threaded into holes 320. Thus, alignment pins 390 clamp connector 330 against brace 314 and HDD 200.

Installation will now be discussed, for simplicity, without reference to numerals associated with the discussed elements. The HDD/carrier assembly is positioned such that the connector is generally aligned with the bay connector interface. Once the alignment pins enter the pin receptacles, the HDD/carrier assembly may be further inserted into the bay by lowering the nubs into the boot interface vertical slots. After the nub has traveled down the vertical slot, the carrier is slid toward the bay forward wall until nubs are snugly seats into the tapered horizontal slot. Thereafter, a lid or cover (not shown) may be used to enclose the bay. A bezel or similar feature may be used in the space between the creased portion of the brace and rear wall. This bezel may urge the HDD/carrier assembly toward the front wall and thereby assist in securing the HDD/carrier assembly in the bay.

The above discussion is meant to be illustrative of the principles and various embodiments of the present invention. Preferably, all parts are made of light-weight steels and plastics in order to minimize the overall weight of carrier 300. Numerous variations and modifications will become apparent to those skilled in the art once the above disclosure is fully appreciated. For example, it may be viewed as advantageous to provide nubs within the bay and complementary slots on the brace. Such modifications are within the scope of the present invention. Moreover, the present invention may be advantageously used for number of computer hardware and peripherals that may be utilized in applications where mounting arrangements account for factors such as multiple hardware configurations and shock resistance. It is intended that the following claims be interpreted to embrace all such variations and modifications.

What is claimed is:

1. A system for installing a storage device on a computer comprising:
    a carrier having spaced-apart parallel arms configured to receive the storage device;
    a first member comprising a nub disposed on one of said parallel arms;
    a bay associated with the computer, said bay having a cavity suitable for receiving said storage device; and
    a second member comprising about formed in said bay, said second member engaging said first member when said carrier and said storage device are placed in said bay and slid along a first axis.

2. The system of claim 1 wherein said carrier and said bay form a substantially rigid connection along an axis normal to said first axis after said carrier and the storage device are slid along said first axis.

3. The system of claim 1 wherein said carrier further comprises at least one alignment pin; and wherein said bay further comprises a receptacle complementary to said alignment pin.

4. The system of claim 1 wherein said recessed portion comprises a tapered slot adapted to provide increasing clamping pressure on said nub when a HDD docks into the computer.

5. The system of claim 1 wherein said carrier further comprises an alignment pin affixed to one of said parallel arms; and wherein said bay further includes a receptacle for receiving said alignment pin.

6. The mounting system of claim 1 where said carrier is structurally integral with the storage device.

7. A mounting system for a computer, comprising:
    a first HDD having a first thickness;
    a second HDD having a second thickness, said second thickness being greater than said first thickness;
    a first member comprising a first nub disposed said first HDD;
    a second member comprising a second nub disposed said second HDD;
    a bay associated with the computer, said bay including a cavity having a thickness sufficient to accommodate said second thickness of said second HDD; and
    a third member comprising a boot interface having a recessed portion, the recessed portion adapted to receive said first and second nubs formed in said bay, said third member engageable with said first member when said first HDD is docked into said bay, said third member also engageable with said second member when said second HDD is docked into said bay; thereby said first and second HDDs being operably interchangeable in said bay.

8. The mounting system of claim 7 wherein said recessed portion comprises a tapered slot adapted to provide increasing clamping pressure on said nubs when said first and second HDDs are docked into said bay.

9. A method of exchanging a storage device between a first and second bay, the method comprising:
    removing said storage device from said first bay by sliding said storage device along an axis, said first bay comprising a second member, which includes a boot interface having a recessed portion, and said storage device comprising a first member, which includes a nub, said recessed portion adapted to receive said nub, said first member operably engageable with said second member; and
    installing said storage device in said second bay, said second bay comprising a third member and said third member being operably engageable with said first member.

10. The method of claim 9 wherein said storage device comprises a carriage having spaced apart parallel arms configured to receive said storage device and wherein said first member is disposed on one of said parallel arms.

11. The method of claim 9 wherein said first and second bays further comprise connector interfaces and receptacles mounted in said first and second bays, said receptacles being installed at a predetermined distance from said connector interfaces; and wherein said storage device comprises at least one alignment pin affixed to said storage device; and wherein said step (a) further comprises slidably disengaging said at least one alignment pin from said receptacle in said first bay and said step (b) further comprises slidably engaging said at least one alignment pin with said receptacle in said second bay.

12. A computer system, comprising:
    a storage device;
    a chassis having a bay wherein said bay further comprises a cavity suitable for receiving the storage device; and
    a carrier adapted to securely receive said storage device; wherein said carrier docks into said bay when slid along a first axis; wherein said carrier comprises spaced-apart parallel arms configured to receive said storage device, a first member, which includes a nub, being disposed on one of said parallel arms; and wherein said bay further comprises a second member, which includes a boot interface having a recessed portion, said recessed portion adapted to receive said nub formed in said bay, said second member engaging said first member when said carrier and the storage device are placed in said bay and slid along said first axis.

13. The system of claim 12 wherein said carrier and said bay form a substantially solid connection along an axis normal to said first axis after said carrier and the storage device are slid along said first axis.

14. The system of claim 12 wherein said carrier further comprises at least one alignment pin; and wherein said bay further comprises a receptacle complementary to said alignment pin.

* * * * *